United States Patent
Taylor

(10) Patent No.: US 10,252,764 B2
(45) Date of Patent: Apr. 9, 2019

(54) HANDLEBAR WITH INBOARD DROPS

(71) Applicant: William A. Taylor, Evergreen, CO (US)

(72) Inventor: William A. Taylor, Evergreen, CO (US)

(*) Notice: Subject to any disclaimer, the term of this patent is extended or adjusted under 35 U.S.C. 154(b) by 0 days.

(21) Appl. No.: 15/674,392

(22) Filed: Aug. 10, 2017

(65) Prior Publication Data

US 2018/0043961 A1    Feb. 15, 2018

Related U.S. Application Data

(60) Provisional application No. 62/372,995, filed on Aug. 10, 2016.

(51) Int. Cl.

| | | |
|---|---|---|
| *B62K 21/12* | (2006.01) | |
| *B62K 23/02* | (2006.01) | |
| *B62M 25/04* | (2006.01) | |
| *B62K 23/06* | (2006.01) | |

(52) U.S. Cl.
CPC ............. *B62K 21/12* (2013.01); *B62K 23/02* (2013.01); *B62K 23/06* (2013.01); *B62M 25/04* (2013.01)

(58) Field of Classification Search
CPC ...... B62K 21/12; B62K 21/125; B62K 23/02; B62K 23/06; B62K 11/14; B62M 25/04
USPC ........................................................ 74/551.1
See application file for complete search history.

(56) References Cited

U.S. PATENT DOCUMENTS

| | | | |
|---|---|---|---|
| 689,217 A | 12/1901 | Palmer | |
| 1,616,021 A | 2/1927 | Joseph | |
| 4,503,729 A | 3/1985 | Shimano | |
| 4,750,754 A | 6/1988 | Lennon | |
| 5,138,893 A | 8/1992 | Copeland | |
| 5,144,859 A | 9/1992 | Malone | |
| 5,209,508 A * | 5/1993 | Lennon | B62K 21/125 280/261 |
| 5,524,506 A | 6/1996 | Terry | |
| 5,758,548 A * | 6/1998 | Smith | B62K 21/125 74/551.1 |
| 6,234,043 B1 | 5/2001 | Marshall | |
| 6,485,396 B2 | 11/2002 | Stevens | |
| D634,378 S | 3/2011 | Iverson et al. | |
| D729,032 S | 5/2015 | Gu | |
| 2003/0094067 A1 | 5/2003 | Whiting et al. | |
| 2004/0089095 A1 | 5/2004 | Chiang | |
| 2004/0231451 A1* | 11/2004 | Chiang | B62K 21/12 74/551.1 |
| 2005/0166704 A1 | 8/2005 | Huang | |

(Continued)

OTHER PUBLICATIONS

Printed Dec. 3, 2010. http://www.zipp.com/_media/pdfs/support/zipp_aero_edge_flyer_11.pdf, 2 pp.

(Continued)

*Primary Examiner* — David H Bollinger
(74) *Attorney, Agent, or Firm* — Lathrop Gage LLP

(57) ABSTRACT

A bicycle handlebar includes a top section, a first hook and second hook extending downward from each end of the tops section, and a first drop and a second drop extending rearward from an end, opposing the top section, of the first hook and second hook, respectively. The first width of the top section may be greater than a second width between each of the first drop and the second drop.

20 Claims, 3 Drawing Sheets

(56) References Cited

U.S. PATENT DOCUMENTS

| | | | |
|---|---|---|---|
| 2006/0145446 A1* | 7/2006 | Schmider | B62K 19/30 280/281.1 |
| 2012/0304803 A1 | 12/2012 | Meggiolan | |
| 2013/0298720 A1 | 11/2013 | Lanz | |
| 2014/0069226 A1* | 3/2014 | Wu | B62K 21/12 74/551.1 |
| 2015/0128756 A1* | 5/2015 | Gu | B62K 21/16 74/551.1 |
| 2015/0151809 A1* | 6/2015 | Li | B62K 21/18 74/551.1 |

OTHER PUBLICATIONS

Hurcom, S. "Would you benefit from narrower handlebars?" Nov. 12, 2015, Available at http://www.cyclingweekly.com/news/latest-news/would-you-benefit-from-narrower-handlebars-199446, 15 pp.

"What's New for 2013: Adam Hansen's Narrow Bars." Printed Jan. 24, 2013, http://inrng.com/2013/01/whats-new-with-rider-position/, 24 pp.

Available at https://togabikes.com/product-list/parts-1051/handlebars-1073?startRow=361, 2 pp.

Available at https://www.ebay.com/itm/Carbon-UD-Road-Bike-Handlebar-Bicycle-Racing-Drop-Bar-Cycling-31-8-400-420-440mm-/262569240725, 3 pp.

Handlebar comparison. Printed Aug. 10, 2015, http://www.aeroweenie.com/assets/img/data/tour-road-bars.png, 2 pp.

Aero Data. Printed Jul. 8, 2013, http://www.aeroweenie.com/data.html, 5 pp.

Aerobar Watts Comparison USE R1 vs TULA. Printed Apr. 12, 2016, http://www.aeroweenie.com/assets/img/data/USE-R1.jpg, 1 pg.

Printed Mar. 1, 2015, https://bp4.bike/#video, 5 pp.

Bicycle Quarterly 57 (Autumn 2016). Printed Jul. 12, 2017, https://www.compasscycle.com/shop/print/issues/bq-57-autumn-2016/, 5 pp.

Prasuhn, J. "Was the First Aerobar Really Not the First?" Updated on Jun. 19, 2012, Available at http://www.triathlete.com/2010/07/insidetri/was-the-first-aerobar-really-not-the-first_11039, 37 pp.

Available at https://www.google.com/search?q=Penseyres+handlebar&ibm=isch&tbo=u&source=univ&sa=X&ved=0ahUKEwjDgs-bwbHVAhUGyoMKHflgC7oQ7AkINA&biw=1587&bih=981, 2 pp.

Deakins, T. "Handlebars for Touring." Printed Nov. 24, 2005, http://sheldonbrown.com/deakins/handlebars.html, 7 pp.

Delaney, B. "How to ride faster without pedaling harder" Jan. 18, 2017, Available at http://www.bikeradar.com/road/news/article/how-to-cycle-faster-instantly-without-riding-harder-42744/, 5 pp.

The GCN Network link Oct. 2016. Printed on Oct. 10, 2016 "How to Choose the Right Handlebars for Your Road Bike", available at https://www.youtube.com/watch?v=-P-QynImMuo.

Stationary Bike Bars. Printed on Nov. 14, 2016, https://www.slideshare.net/Internationgd/real-road-ride-indoors, 18 pp.

ZIPP hand positions. Available at https://www.google.com/search?g=zipp+handlebar+hand+position&tbm=isch&imgil=9SRb6U6hfP6dkM%253A%253BBw2Upr2LJxEIMM%253Bhttp%25253A%25252F%25252Fwww.zip.com%25252Fbars%25252Fservice-course-si-70-ergo---&25252F&source=iu&pf=m&fir=9SRb6U6hfP6dkM%253A%252CBw2Upr2LJxEIMM%252C_&usg=_UowtgoWvc27Aurblbwgpm1mBugw%3D&biw=1285&bih=697&ved=0ahUKEwiUsYzD2g3PAhVM32MKH6ECkAQyjclMg&ei=5W7pV9SgFcy-jwO-iagABA#imgrc=9SRb6U6hfP6dkM%3A, 3 pp.

Antler Bars, Lock bars, cool bars, Available at https://www.google.com/search?g=bicycle%20handlebar%20specifications&tbm=isch&tbs=rimg%3ACf1cgrLepMM2lijtPMw4MPhkx6E1VLoQ6HOvjtW1G658qtTZaP6QgR0gE-Dd7yAIAMsFYgXhHLgQZWFLbIS3fUVcDSoSCe08zDgw-GTHEbmlsRM7dGeRKhlJwTVUuhD0c68R8HIggJpuPesqEgmO1Ygbmyg21BFfmkezidiuyCoSCdlo1pCBHSATEZUx0CwJuxS0KhIJ4N3vlAgAywURxjVAaYS90fcgEgiipeEcuBBIYREdexvpu/viGBgHSoSCUtshLd9RVwNEa_1IRcl4RKTI&tbo=u&bih=979&biw=1599&ved=0ahUKEwicody_76vPAhUQ3YMKHeD3CkUQ9C8ICQ&dpr=1&bav=on.2,or.&bvm=bv.135258522.d.amc&ech=1&psu=5yT5V-u6NsbdsjwTgmrU4.147594, 2 pp.

Benedict, T. "New Zipp SL70 Aero Road Handlebars Makes Ergonomics Fast & Light." Mar. 11, 2014, Available at https://www.bikerumor.com/2014/03/11/new-zipp-sl70-aero-road-handlebars-makes-ergonomics-fast-light/, 4 pp.

3DD Transition Drop Bars. Sep. 20-22, 2017, 2017 Interbike, Booth: 14256, Mandalay Bay Convention Center, Las Vegas, 4 pp.

3DD Transition: Road Race Drop Bars, Press Release (2017). Available at http://naerospeed.wixsite.com/proto, 1 pg.

* cited by examiner

HANDLEBAR WITH INBOARD DROPS

RELATED APPLICATIONS

This application claims priority to U.S. Provisional Application Ser. No. 62/372,995 filed on Aug. 10, 2016, which is incorporated by reference in its entirety herein.

COPYRIGHT NOTICE

A portion of the disclosure of this patent document contains or may contain material that is subject to copyright protection. The copyright owner has no objection to photocopy reproduction of the patent document or the patent disclosure exactly as appearing in the Patent and Trademark Office patent file or records, but otherwise all copyright rights whatsoever are reserved. 37 CFR 1.71(d).

FIELD OF THE EMBODIMENTS

The embodiments herein relate to handlebars generally and in particular to bicycle handlebars that are more versatile and bring a performance advantage.

BACKGROUND

Bicycles and bicycle racing have been around for more than 100 years, the art is evolved and generally well known.

The bicycle business has grown a lot in recent years as persons become more health conscious and recognize the many benefits cycling provides such as better cardiovascular health, endurance, and weight loss. Bicycles make it easy to experience the outdoors, and make for great transportation having low environmental impact. It's a low physical impact activity that's also great for older persons. Bike racing is more popular now than ever before at all ages.

The bicycle has become an extremely efficient machine. Manufacturers sell bikes today that are in the 10-15 pound range out of the box. Bicycle and component manufacturers vie for sales touting stiffness and strength, light weight, and aerodynamic features that save mere seconds over distance. These savings are often expressed in time saved over a 40 kilometer course, as watts saved as a measure of expended power or as a reduction in aerodynamic drag. Bike frames used to be steel. But today aluminum, titanium or carbon fiber are more common.

Even bike frames are made aerodynamic. Brakes are minimized and hidden. Rear wheels can be tucked in behind the frame, dimpled like golf balls, have toroidal shapes, employ smoothing fillers between tire and wheel, use bladed spokes or have other features to alter air flow patterns, reduce drag, and go faster. As aero optimization evolves even minimal savings are important. Racers wear tight clothing, shave their legs, and wear shoe covers. Even some shoe cleats are dimpled to save a few watts.

Wind resistance and drag is clearly one of the biggest problems cyclists must overcome. But it is the human body that makes the most drag on a bicycle. Positioning that can narrow or otherwise reduce the body's profile is especially valuable racing, touring or commuting. As the bicycle and handlebar combination is already highly evolved and the field of the art is crowded, small changes are significant.

In racing the difference between winning and losing can be mere fractions of a second. The 1989 Tour de France was won by just 8 seconds after more than 2000 miles. Stage 7 of the 2017 Tour de France was won by just 6 millimeters (mm) after 132 miles. There are 1,609,344 mm in 1 mile. The Tissot timing system clocked the difference between 1st and 2nd place at 0.0003 seconds. What may have been a tie or dead heat years ago might not be today. Better timing and photographic means separate riders and make any aerodynamic benefit or other advantage critically important.

Wind-cheating aero designs are important in bike design for efficiency, handling and marketing. The time trial (TT) handlebar or aerobar centers a rider's hands and arms in a forward position to approach a more arrow-like body position that naturally pierces the wind and minimizes aerodynamic drag. Its rider goes faster for the same power output. But the TT bar is awkward, unsuitable for many conditions, requires a high learning curve and places the hands far from the brakes. This makes it inappropriate in many situations, and it is often banned from road races and group rides.

Another aero handlebar was popularized in the 1980s by Tour de France winner Greg Lemond. Bringing the arms in is a known aerodynamic advantage in cycling. Lemond's Drop-In Bar sold by Scott, a European manufacturer known for ski gear, was essentially a contemporary road bar with extended lower portions that allowed more hand positions. These lower grips extended inward perpendicular to the bicycle frame, protruding inward from the lowest section of the traditional road cycling drop bar. This allowed the hands to grip horizontally, that is, with knuckles up and palms down, but with hands and arms brought in to achieve an aerodynamic benefit. Problems with this design were its extra mass—it weighed almost twice as much as its contemporaries—it placed the hands farther from the brakes and it could interfere with the knees when pedaling standing up out of the saddle.

SUMMARY OF THE EMBODIMENTS

Embodiments discussed herein modify a lower portion to achieve more hand positions that facilitate a narrow and aerodynamic body position. This improvement offers benefits of a TT bar in a road bar. Riding with hands "on top" and "on the hoods" is unchanged, but riding "in the hooks" or "in the drops" brings the hands and arms closer together putting the body into a more aerodynamic position. The rider is streamlined this way with arms and shoulders brought inward to reduce drag. With embodiments discussed herein, a rider has the best of all worlds—the evolved road cycling handlebar fitting modern shifters, brake mechanisms, and accessories along with all the usual grip and hand positions up top while offering remarkably more aero options below in the hooks and drops. This improves performance and is a big help racing and in headwinds. Much better than a TT bar, the brakes are always near, so the embodiments herein are safer than prior handlebars, too.

In a first aspect of embodiments herein, a bicycle handlebar includes a top section, a first hook and second hook extending downward from each end of the tops section, and a first drop and a second drop extending rearward from an end, opposing the top section, of the first hook and second hook, respectively. The first width of the top section may be greater than a second width between each of the first drop and the second drop.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Embodiments discussed below are superior to previous models for many reasons. The below embodiments are more versatile and suits today's performance oriented rider. They offer new hand positions that help to streamline the body and greatly reduce drag while retaining the best features of traditional road drop handlebars.

The human body has three contact points with a bicycle—hands, feet and posterior. These contacts largely determine body position. Small changes in position can have disproportionate and surprisingly big effects on rider comfort, power generation, aerodynamics and speed.

Figure 1:
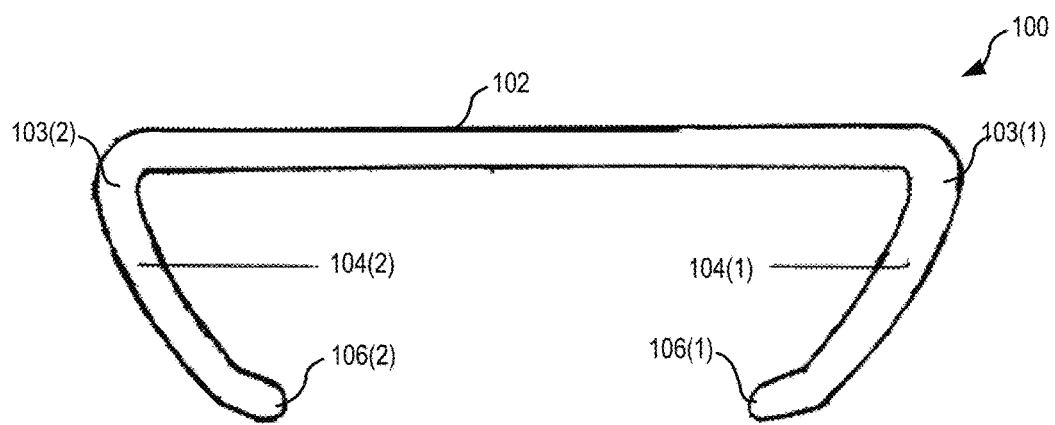
FIG. 1 is a front view of embodiments of a handlebar with inboard drops.
Figure 2:
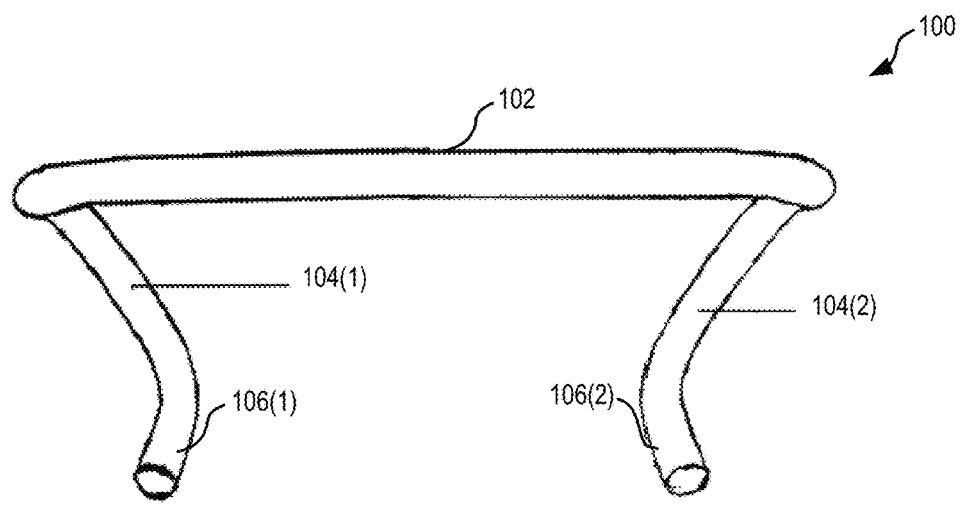
FIG. 2 is a rear view of the handlebar with inboard drops of FIG. 1.
Figure 3:
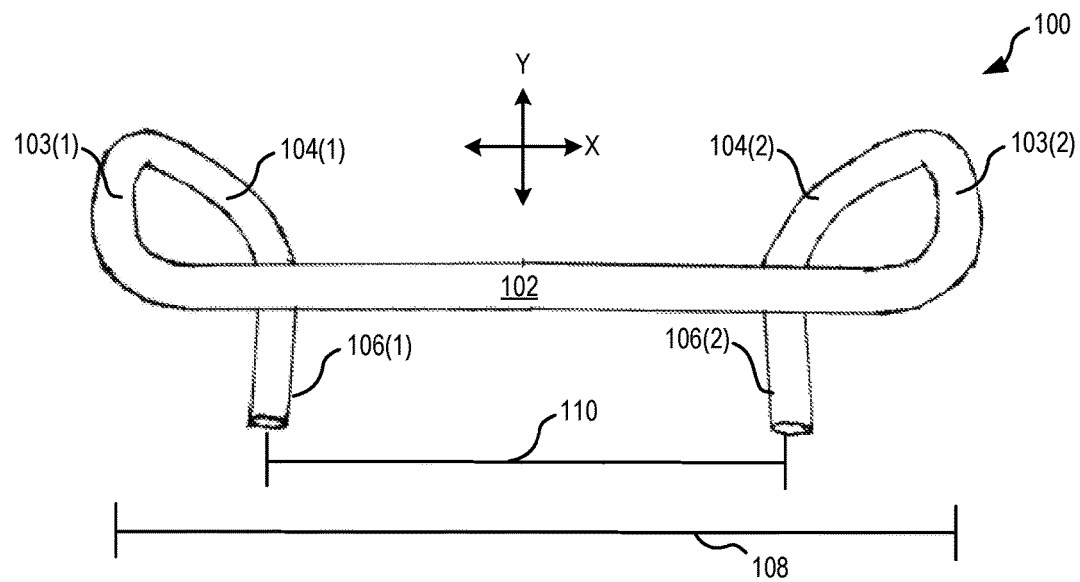
FIG. 3 is a top view of the handlebar with inboard drops of FIGS. 1-2.
Figure 4:
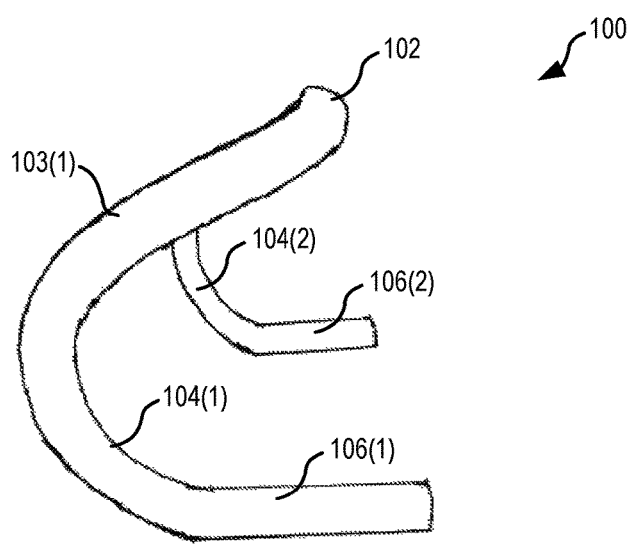
FIG. 4 is a side view of the handlebar with inboard drops of FIGS. 1-3.
Figure 5:
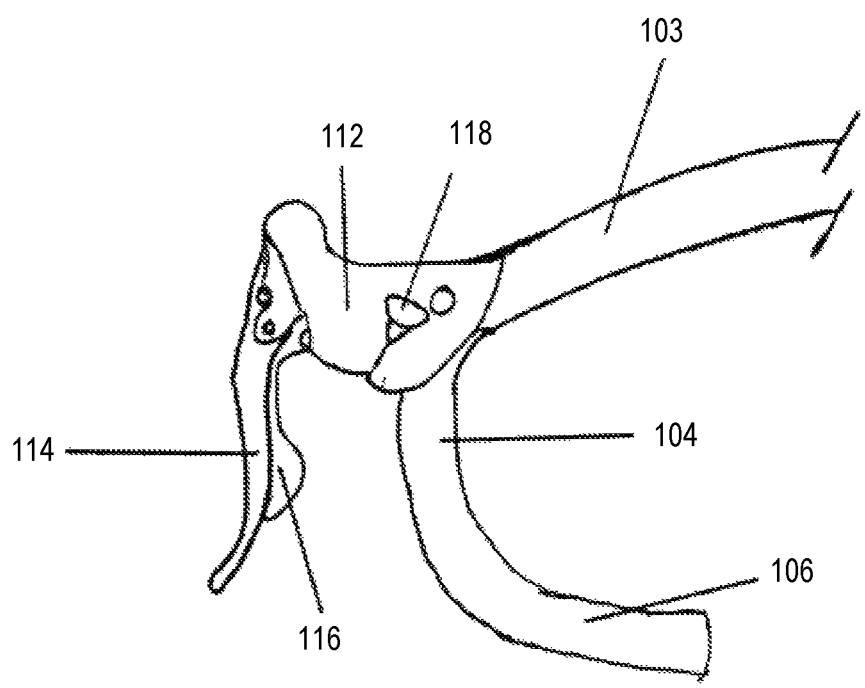
FIG. 5 is a partial inside view of one side of a handlebar with inboard drops showing embodiments including a brake and shifter mechanism mounted with hood.

FIG. 1 is a front view of embodiments of a handlebar 100 with inboard drops. FIG. 2 is a rear view of the handlebar 100. FIG. 3 is a top view of the handlebar 100. FIG. 4 is a side view of the handlebar 100. FIG. 5 is a partial inside view of one side of a handlebar (such as handlebar 100), including embodiments with a brake 114 and shifter 116, 118 mechanism mounted with a hood 112. FIGS. 1-5 are best viewed together with the following description.

As shown in FIGS. 1-4, the handlebar 100 may include tops 102, hooks 104, and drops 106. Embodiments may further include ramps 103. FIG. 5 depicts the handlebar with additional control gear such as hood 112, brake 114, and shifters 116, 118. Handlebar 100 may couple with a bicycle at tops 102. As used herein, "tops" refers to the top-most section of the handlebar. As used herein, "ramps" refers to a portion of the handlebar extending from the tops in at least a forward and/or downward direction. As used herein, "hooks" refers to a portion of the handlebar extending from the tops or ramps and extending at least in any one or more of a downward, rearward, and inward direction. As used herein, "drops" refers to a portion of the handlebar extending from the hooks at least in a rearward direction. "Forward," "rearward," "downward," "upward," "inward," and "outward" are all indicated from the perspective of the rider.

Embodiments herein present a decrease in overall bar width from tops to drops. FIG. 3 depicts a first width 108 of the tops, and a second width 110 between the drops. As shown, the difference between first width 102 and second width 104 is 12 centimeters (cm) or more, 6 on each side, as seen in FIG. 3, but said difference may be other dimensions as well. For example, a 44 cm bar as measured at its widest on tops 102 (or in embodiments, at the ramps 103) may decrease in overall width to 32 cm at the drops—a greater than 25% reduction in space (resulting in the second distance 110 being 75% or less than the first distance 108). It should be appreciated that this percentage reduction in space may be more or less, such as a 10% reduction in space (resulting in the second distance 110 being 90% or less than the first distance 108). As this naturally brings the wrists, forearms, elbows, upper arms, and shoulders in as well, the overall effect is magnified, which results in a large reduction in drag and a big aerodynamic benefit that's supported by testing.

In embodiments, the drops 106 are positioned inward by modifying the hooks 104. Conventional rounded hooks in a "C" shape from the side view have advantages of allowing an infinite number of hand positions and making hand movements or transitions easy while providing ready access to the controls (brakes and shifters). But the traditional drop bar has a vertical alignment in a front view where the drops are basically the same width as the tops above. With embodiments of the handlebar 100 herein, the hooks 104 may be slanted and/or curved from the front view, with a new inward bend in an upper portion of the hooks 104. This results in the hooks 114 having a "V" shape, or an acute angle with respect to the tops 102, when viewing from the front (FIG. 1) or rear (FIG. 2) views. As shown, the drops 106 extend along a first axis, respectively, that is perpendicular to the axis of the tops 102. For example, as shown in FIG. 3, the tops 102 extend substantially along the X-axis, while the drops 106 extend substantially along the Y-axis (but offset from the X-axis). It should be appreciated, however, that tops 102 and drops 106 may extend along non-perpendicular axis as well (such as, but not limited to, inward or outward) without departing from the scope hereof. New aero and other benefits are thus available in the lower sections while the rest stays normal above. The usual riding positions on top that defer aerodynamics to casual riding and comfort are retained as are fitment options for conventional attachments, namely, the controls plus bells, cycling computers, cameras and the like. Notwithstanding, in this embodiment there are options to achieve inboard drops as the connection between the tops and the drops may take any form or be by any means. It's also notable the prior art has trended away from the embodiments herein towards drops that come outward for a bit more comfort and stability at the cost of more drag.

Embodiments herein provide many significant advantages over prior handlebars. These advantages include, but are not limited to: (1) Better aerodynamics; (2) More hand and body positions; (3) Ergonomics; (4) Safety; (5) Ease of use; (6) Retention of popular features; (7) Compatibility; (8) Low cost per watt saved; (9) Market potential; and (10) Aesthetics.

Aerodynamics

The embodiments herein offer new aerodynamic options previously unobtainable with a traditional drop bar. The benefits are clear and irrefutable. Testing has shown 160 seconds saved over a 40 kilometer course with hands changed from positions on hoods to in drops. This compares very favorably to 60 seconds saved with a traditional drop bar shape hoods to drops at the same width. This aerodynamic benefit is achieved not by the bar itself, but by body position created when using the handlebar 100 discussed above. Riders can choose how aerodynamic they wish to be in any situation just by where they put their hands.

Hand and Body Positions

The embodiments herein offer new hand positions to the cyclist. Viewed in three dimensions hand positions down the hooks 104 and in the drops 106 are new in space. More options are often desirable and beneficial. Riders may have lower back and cervical problems that are aggravated by riding repetitively in the same position. It helps to have more choices in hand and body positioning. Certainly aging cyclists are less flexible and often have difficulty getting lower and into a TT position, while becoming even marginally more narrow may provide an equivalent aerodynamic benefit.

Moreover traditional drop bars don't let the hands and arms come inward in the lower sections at all, which is a disadvantage. Embodiments herein allow the rider to select how narrow they want to be simply by sliding their hands up or down along the hooks 104 and drops 106. With fixed power, max speed and aero gains are achieved when as low and narrow as possible. But a rider can just slide their hands up in response to varying or anticipated conditions, such as if gusty winds present, there are obstacles such as potholes, other riders nearby or simply if one doesn't feel like going "all out." Since high in the hooks 104 the width is about the same as usual the cyclist gives up almost nothing with this design. Studies show riders spend 80% of their time up top anyway.

Ergonomics

Cycling may result in overuse and repetitive injury problems. Good bike fit is important to pros and weekend warriors alike. But once a bike is sized and set up, there aren't a lot of options for positioning on the road. Pedals are fixed, the saddle is fixed and so is the handlebar. While a road drop bar has options, they're limited in comparison to the embodiments. Going from tops to drops is a two dimensional exercise with most traditional bars. With the embodiments herein, it becomes three dimensional.

In embodiments herein, the handlebar 100 is more ergonomic, facilitating a more natural movement between the hoods 104 and drops 106 as the arms necessarily move in circular arcs from the shoulder sockets, and as hands and outstretched arms come closer together. Tilting the hands from a straight vertical alignment to slight angles here (for example, 11:00 and 1:00 o'clock, respectively) in the hooks 104 can also be more comfortable and natural. In general nothing of the human form is perfectly straight and conforming to straight devices may promote discomfort or repetitive injury over time.

Safety

TT aerobars used mainly in time trials and triathlons reduce drag but aren't practical for everyday riding. They can easily double the weight of a typical road drop bar. As a specialty item, there are fewer manufacturers and they're more expensive. They also require a lot of getting used to and are frequently customized, which is even more time consuming and pricey. Bolt-on aero extensions are an option, but they still suffer from the same problems. Perhaps the worst part is any aerobar extension places the hands far from the brakes, which make them a dangerous safety hazard in gusty winds, or when something unexpected happens. Group rides often prohibit their use for this very reason. They not only put more weight on the front wheel, but they put the hands and forearms together which makes steering difficult. To even reach the brakes requires an entirely new grab in space. There is no continuity between aerobar hand positions and the brake levers.

Racers frequently try to achieve the benefit of aerobars or extensions without them. This is accomplished by resting both forearms on the top of the traditional drop bar to mimic a true time trial position. But the regular drop bar isn't meant for this, and there is no adhesion of the forearms to the bar. So, while this position does reduce drag it's an unsafe practice. It's slippery, uncomfortable, steering is compromised and brakes aren't handy. Still, racers and pro rider do this a lot as witnessed in the 2017 Tour de France. A tuck position is similar where riders crouch low gripping the bar on either side of center, usually on descents. It's hard to make power in this position and it's usually reserved for descents. The tuck position is also less safe, since it suffers from compromised steering and the brakes are some distance away from the hands.

The embodiments herein allow aero savings with brakes 114 easily in reach. Even from the most aerodynamic position low in the drops 106 the rider need only slide his/her hands up along the bar a short distance to the hooks 104 to reach the brakes 114 and need never fully let go.

There is another benefit of having the drops 106 and/or bar tips at drops level brought inboard. They are less likely to hit and poke things. In fact while open tubes are generally plugged with plastic inserts, these are notorious for falling out and in an accident a sharp open tube presents an additional safety hazard lessened with the drops 106 inboard. A smaller overall dimension also helps with storage, travel and shipping.

Ease of Use

Riders spend 80% of their time using the top portions of drop handlebars. It's common to hold the bar on top, or with hands at the corners (on top along the forward bends at each side) or with palms resting on the brake and shifter hoods with fingers out and thumb in. The present embodiments require no change here.

The learning curve is short. Underneath, with hands high in the hooks 104, there is still little change from what riders are used to. It's only as the rider set his/her hands farther down in the hooks 104 and into the drops 106 that the difference becomes notable. The rider alone decides when to take advantage of the benefits offered by the handlebar.

In some embodiments forearms may touch under the bar tops 102 when the rider is in certain positions. This has the advantage of creating another contact point closer to the body for more stability and control. As such, it should be appreciated that the tops 102, while shown herein as being straight, may be angled, curved or otherwise fashioned to mate comfortably with the forearms without departing from the scope hereof. Conversely some embodiments may minimize or eliminate such contact for unfettered access to drops 106 and hooks 104.

Retention of Popular Features

The present embodiments retain almost all of the most important features of traditional drop bars. Cyclists may enjoy the same wide top and comfortable hand positions all along the top. Unlike with aerobar extensions or the prodigious Scott Drop-in-Bar this style adds no significant weight. Very low weight is preserved as overall tube length is only marginally altered along the course of the hooks. Traditional TT extensions and bars have significant extra mass and weight, as extensions are commonly 30 cm or more in length each plus have forearm rests and pads.

Tubing may be round or may be flattened into popular wing or other shapes, which are more aero in and of themselves.

Compatibility

All of the popular accessories—bike computers, cameras, bells, etc.—may be fitted as usual. The control mechanisms, brakes 114 and shifters 116, 118, clamp on normally albeit optionally with some variation to align the levers and fit the controls with angled hooks 104. Handlebar 100 attaches to the bicycle in the same way. Handlebar 100 may be offered with or without common internal cable routing of brake and shifter cables. In other words, the tops 102, and at least part of the hooks 104 where the hood 112 couples (as well as other components such as the drops 106) may be hollow or otherwise grooved (or channeled) to provide a location for cable routing. Even the same handlebar tape can be used. There is nothing more required, and it's an elegant solution.

Low Cost Per Watt Saved

There is an old saying in cycling, "Strong, light or cheap—pick two." As bikes get lighter and lighter the cost to shave incremental grams goes up exponentially. While weight alone is an advantage on a hill climb, aerodynamics is recognized today as making a greater contribution to pure speed on flatter courses and when the average speed exceeds about 15 miles per hour.

A set of high end aero racing wheels today can cost upwards of $2000. The domestic manufacturer Zipp claims a set of its 404 Firecrest wheels with a 58 mm rim depth ($2100 retail) saves 80 seconds over a 40 kilometer course (http://www.zipp.com/_media/pdfs/support/zipp_aero_edge_flyer_11.pdf).

Testing of the present embodiments has yielded a time savings of approximately 100 seconds over the same distance. Since the effort to produce this new handlebar is less, it may be sold for a fraction of the price of high end wheels to achieve the same aero benefit and reduction in drag. This is a better bang for the buck.

Marketability

The embodiments herein are similar to most road drop bars on top, and may be produced for a similar price. Thus retail pricing can compete with current bars. This is a reason to upgrade or replace, and the replacement market alone is big. Size choices, different styles, wing designs and other options present additional marketing and sale opportunities.

Most drop bars are sold in 40 cm, 42 cm or 44 cm widths to fit most riders. The common dimensions are width, reach and drop with reach commonly 70 to 100 mm and drop, 125 to 150 mm A rider may find s/he prefers a 42-82-136, for example, referring to each measurement, respectively. But with the new transition here, the change in width from tops to drops, we bring an entirely new dimension to size and fit.

Some riders may prefer a lesser or greater transition than others. Accordingly for a 42 cm bar the difference between first and second widths 108, 110 on may be a 6 cm, 8 cm or 10 cm reduction to the drops. This example alone demonstrates three options within one traditional size and presents additional sales opportunities. Using the example above, there may be a 42/34-82-136. Our very nomenclature (42/34) distinguishes a non-conventional configuration of the handlebar.

Big and tall riders may benefit even more from the embodiments herein. J & K brand bars are up to 50 cm wide overall to fit large riders with wide shoulders. Drops at 34 cm would represent a 32% savings in width. As bigger riders naturally present more drag, they can benefit even more.

Aesthetics

The embodiments herein stand out in the crowded field of road bike drop bars. The benefits are easy to grasp while viewing a wide array of handlebars.

To summarize, the embodiments herein result in a new, unique way to achieve desired results to the rider. More than a thousand handlebars were evaluated from antique to present day and none offer the features and benefits of the embodiments herein. Major handlebar manufacturers, prominent bike shop owners and professional cyclists were interviewed including Tour de France racers and none have seen the handlebar 100 discussed herein. The embodiments herein are an important and elegant solution to the problem of greater drag that increases with higher speeds, which presents itself in wind or naturally to big and tall riders that have to push a bigger front profile.

The embodiments herein provide a superior handlebar perfectly suited to today's road cyclist. It makes cyclists faster and is the very definition of free speed. It's aesthetically pleasing and commercially viable. Not only is the appearance enhanced, but the benefits are numerous and undeniable. A narrower profile is faster, and here it's made possible while retaining all of the important features that road cyclists are used to and that accessory and components makers already design and build for. It's the best of both worlds.

Unlike GU in US Patent Application 2015/0128756 performance cyclists don't want to ride with a less aerodynamic bar that extends outward at bottom solely for the rare time they want to be both lower and more stable at the same time. Riding in the drops is generally considered to be more aerodynamic, not less. That is, riders get low mainly to cheat the wind not for other reasons. Stability as touted by GU is rarely an objective for a road cyclist in the drops—they would simply have their hands on top or on the hoods. With the embodiments herein, the upper hooks also permit a wide and traditional posture having the brakes and shifters easily within reach, practically unchanged from what cyclists are accustomed to. Thus, shifting and braking is routine. As mentioned even our new sizing parameters that spell out the 42 cm to 34 cm transition (42/34 above) reinforce the 3D novelty of the embodiments herein.

Changes may be made in the above methods and systems without departing from the scope hereof. It should thus be noted that the matter contained in the above description or shown in the accompanying drawings should be interpreted as illustrative and not in a limiting sense. Sizes, shape and any number or combination of materials are just a small part. The handlebar embodiments herein may be offered with integrated stem, extensions, embedded accessories or mounting apparatus. They may flare, bend, twist or change shape at any point along its length. Cables may be fitted with internal or external adaptations. Controls may be fitted by way of adapters or tube modifications. The controls themselves may be modified to conform to or enhance the embodiments herein. Embedded controls, computers, internet, lights, buttons, switches, speakers, displays, adapters, plugs, dampening, sensing, shifting, power, communication, signaling and alternate physical or data transmission means are anticipated by the embodiments herein. As such, there are numerous variations on the theme that fall within the scope hereof. Thus, these and all embodiments described should be viewed as illustrative, rather than limiting. The following claims are intended to cover all generic and specific features described herein, as well as all statements of the scope of the present method and system, which, as a matter of language, might be said to fall therebetween.

What is claimed is:

1. A bicycle handlebar, comprising:
    a top section, a first hook and second hook extending downward from the top section, and a first drop and a second drop extending rearward from the first hook and second hook, respectively, and vertically offset from the top section;
    a first width of the top section being greater than a second width between each of the first drop and the second drop;
    the first and second hook extending at an acute angle from the top section, when the handle bar is viewed from a front or rear view.

2. The bicycle handlebar of claim 1, the difference between the first width and the second width being at least 12 centimeters.

3. The bicycle handlebar of claim 1, the difference between the first width and the second width being at least 6 centimeters.

4. The bicycle handlebar of claim 1, the second width being less than 75 percent or less of the first width.

5. The bicycle handlebar of claim 1, the second width being less than 90 percent or less of the first width.

6. The bicycle handlebar of claim 1, the first and second hook having a V shape.

7. The bicycle handlebar of claim 1, the first drop and the second drop extending along a first axis that is substantially perpendicular to a second axis of the top section.

8. The bicycle handlebar of claim 1, the top section, the first and second hooks, and the first and second drops collectively providing a three dimensional hand placement configurations to a rider.

9. The bicycle handlebar of claim 1, further comprising hoods coupled with brakes and shifters associated with the bicycle.

10. The bicycle handlebar of claim 1, further comprising internal cable routing location on the top section.

11. The bicycle handlebar of claim 1, the top section including flat tubing.

12. The bicycle handlebar of claim 1, the top section being configured to contact forearms of a rider when the rider is positioned with hands in the hooks and/or drops.

13. The bicycle handlebar of claim 12, the top section being angled to contact the forearms.

14. The bicycle handlebar of claim 1, further comprising first and second ramps between the top section and the first and second hooks, respectively.

15. A bicycle handlebar, comprising:
a main body pivotally connected to a bicycle, wherein a first holding portion and a second holding portion are disposed at left and right sides of the main body respectively, the first holding portion and the second holding portion each bend towards a forward riding direction and extend to form a forward bending portion, the two forward bending portions each extend towards a backward riding direction to form a backward bending portion, the two backward bending portions each extend towards the backward riding direction to form a rear section, and a distance between the two backward bending portions is less than a distance between the two forward bending portions:
one of the forward bending portions and the respective rearward bending portion extending therefrom forming a first hook, the other of the forward bending portions and the respective rearward bending portion extending therefrom forming a second hook, the first and second hooks extending at an acute angle from the main body, when the handle bar is viewed from a front or rear view.

16. A bicycle handlebar, comprising:
a top section,
a first and second ramp extending from the top section,
a first hook and second hook extending downward and at an acute angle from the first and second ramp, respectively, and
a first drop and a second drop extending rearward from the first hook and second hook, respectively, and vertically offset from the top section;
a first width of the top section being greater than a second width between each of the first drop and the second drop;
the top section being configured to contact forearms of a rider when the rider is positioned with hands in the hooks and/or drops.

17. The bicycle handlebar of claim 16, the first and second ramps extending downward and forward from the top section.

18. The bicycle handlebar of claim 17, the first and second hooks extending inward and rearward from the ramps.

19. The bicycle handlebar of claim 18, the first and second ramps additionally extending outward.

20. A bicycle handlebar, comprising:
a top section, a first hook and second hook extending downward from the top section, and a first drop and a second drop extending rearward from the first hook and second hook, respectively, and vertically offset from the top section;
a first width of the top section being greater than a second width between each of the first drop and the second drop;
the first and second hook collectively having a V shape.

* * * * *